UNITED STATES PATENT OFFICE

THEODOR OELENHEINZ, OF KARLSRUHE, GERMANY.

PROCESS FOR TREATING THE GREEN JUICE OF TOBACCO-PLANTS.

1,209,327.    Specification of Letters Patent.    Patented Dec. 19, 1916.

No Drawing.    Application filed July 24, 1912.   Serial No. 711,286.

*To all whom it may concern:*

Be it known that I, THEODOR OELENHEINZ, a subject of the Emperor of Germany, residing at 24 Amalienstrasse, Karlsruhe, in Baden, in the Empire of Germany, have invented certain new and useful Improvements in Processes for Treating the Green Juice of Tobacco-Plants, of which the following is a specification.
The present invention has for its object a treatment of the green juice of the tobacco plant, obtained by pressing out green tobacco plants or parts thereof, and freed from those preliminary fermentation phenomena which correspond in their results to the phenomena, accompanying the sweating and drying of tobacco leaves, which treatment corresponds in its results to that fermentation of the leaves, to which they are in Europe subjected after drying. By the so-called "fermentation" the dried tobacco is converted into tobacco ready for use and exhibiting in each case the peculiar aroma belonging to the respective kind of tobacco. Fermentation in the tobacco actually takes place during two, or sometimes three, different stages of the treatment generally used in Europe because not only during the treatment after drying, but during the drying as well, and also during the "sweating" which sometimes precedes the drying, a kind of fermentation takes place.

The drying in its first stages extinguishes the vegetable life, while afterward, probably by enzymotic processes, the decomposable (readily variable) organic substances (amylum for instance) dissolve and the leaf loses its green color and becomes of a yellowish brown. In the ordinary course of manufacture in Europe, the fermentation properly speaking is generally carried out some time after the drying, while in the United States the "sweating," drying and fermentation proper are often united to one process by application of artificial heating. The European terminology will be used hereinafter for the sake of clearness. This fermentation proper imparts the property of burning or glowing and the aroma to the tobacco leaf, which simultaneously assumes the well known tobacco color.

The drying is a natural process which does not necessitate the assistance of any artificial means, whereas the fermentation proper is effected artificially by heating, partly produced by the self-heating of the layered heaps of tobacco and partly by heating the fermentation chamber.

It is known that the green juice contained in the tobacco plant has substantially the same chemical composition as the green tobacco leaf. Now it has already been proposed in the U. S. Patent No. 940,181 to use the juice expressed from green tobacco plants of superior kind, to ameliorate inferior tobacco. To this purpose the green leaves of the inferior tobacco were treated, with the expressed juice of a superior kind and the mixture was caused to undergo some kind of fermentation process. During this treatment, which lasted only a few hours, the temperature was raised up to a maximum of 36-37° C. In its results this process resembled theoretically those phenomena which accompany the sweating and drying of tobacco leaves.

For the reason mentioned above, that the expressed green juice presents substantially the same chemical composition as the green tobacco leaf, it is possible by suitable treatment to produce in the green tobacco juice itself all those chemical reactions that take place in the leaf during the whole treatment of the tobacco.

The green tobacco juice is a strongly smelling liquid not dissimilar to must, which, shortly after its extraction by pressing it out of the constituents of the green tobacco plants, exhibits fermentation phenomena in the form of the development of gases and also of slightly scumming. A muddy deposit settles at the bottom and gradually complete fermentation sets in which makes itself evident by a darker brownish coloration and a reduction of the pungent smell. These phenomena in their results on the chemical constituents of the juice, resemble those which accompany the sweating and drying of tobacco leaves, but not yet those phenomena, which result from the fermentation proper, to which the leaves are subjected after drying.

The course of the phenomena described above can be assisted and accelerated by the employment of artificial means such as moderate heat or by stirring. As obviously in the course of this preliminary fermentation process, which completely corresponds to the sweating and drying of the tobacco leaves, substantially a decomposition of the decomposable substances takes place.

Now in the U. S. Patent No. 940,181 it was proposed as an alternative to the above-mentioned process, to subject the juice before sweating the leaves with it, to a cold fermentation of the aforementioned kind and then treating the green leaves with the juice and suffering them to ferment together during a short time as in the first instance. This treatment also had of course no other effects than those, corresponding to the results of the ordinary sweating and drying of tobacco leaves. From all this it follows, that the treatment was stopped at the stage, at which the fermentation, corresponding to the ordinary fermentation of tobacco leaves after drying, should have begun and the result was an indifferent product.

The process described hereafter tends to improve the treatment of the tobacco juice, expressed from the green leaves so as to subject it to all the alterations, which are suffered by the tobacco leaf during the ordinary manufacture. To this end at the conclusion of the treatment of the juice already known from the U. S. Patent No. 940,181, which treatment corresponds to the sweating and drying of tobacco leaves, a short heating of the juice to about 80° may be useful in order to destroy any injurious products of decomposition and to prevent any formation of mildew. When the juice in this manner is entirely freed from the preliminary fermentation phenomena, it is subjected (and in this resides the essence of the invention) to a further treatment which completely corresponds to the actual fermentation of the dried tobacco leaf and serves to develop in the juice the aroma and the combustible substance and also the peculiar acids present in the prepared tobacco and in particular to produce in it the chemical modification which the tobacco leaf experiences during the fermentation proper.

A self-heating such as is produced in forming the sweating heaps in the fermentation of the leaves is impossible in the case of a liquid, artificial heating must be resorted to entirely and if a high class product is to be obtained this must be done in a particularly careful and intensive manner. The tobacco juice freed from the preliminary fermentation phenomena is cooled in so far as it has been heated (preferably to 25°) and then very slowly heated step by step (advantageously in stages of 10°) to a temperature of from approximately 60° to 70°. In this slow application of heat which extends over a long period, (1-2 weeks instead of a few hours, as in the process according to the U. S. Patent No. 940,181) the raw smell of the juice which has only been freed from the preliminary fermentation phenomena, is replaced by a peculiar smell somewhat similar to that of baked apples which corresponds to the specific fermentation odor of the tobacco leaf. The juice should then be kept for a long time at the temperature of from 60° to 70° until it has assumed a completely deep brown color and in place of the fermentation smell exhibits another very characteristic and highly aromatic exhalation which is different in the case of the several kinds of tobacco. The conversion of the juice is then ended. Now when a completely dried tobacco leaf or a similarly treated leaf of another plant is impregnated with the prepared juice and then dried, it presents exactly the same properties as the finished tobacco leaf as regards smell, taste and burning properties as the kind of tobacco from which the green juice was obtained. The treatment of a green leaf, as in the process according to the U. S. Patent No. 940,181, does not lead to the expected results.

The chemical conversion which the green tobacco leaf undergoes during the fermentation, has therefore arisen in the tobacco juice in the same manner. The juice can now properly be described as fully "fermented" in the sense of the "fermentation" of tobacco leaves. A short heating up to 80° during this treatment and repeated at the end thereof in conjunction with recooling can only serve as an advantageous precautionary measure directed against the presence of products of decomposition, although such are not at all likely to remain at this stage. The intensity of the treatment generally depends upon the nature of the particular kind of tobacco under treatment.

During the actual fermentation of the juice or subsequent thereto the juice can be inoculated with pure cultures of schizomycete such as are found on fermenting and fermented tobacco and which certainly play a part in the fermentation. The green juice treated in accordance with the present invention is a highly favorable culture liquid for these bacteria as all its constituents are employed by them. By means of these bacteria in utilizing the fully fermented juice for impregnating tobacco leaves or leaves of other plants which have preferably been lixiviated previously so as to remove the natural juice they contain, an increased action can be obtained. Furthermore the obtaining and the cultivation of the pure cultures themselves are facilitated by the value of the prepared juice as culture liquid.

A particularly advantageous measure is to add the bacteria of the better kinds to the juice of a less valuable kind. This improves the juice of the poorer kind by imparting the aroma of the better kind. A mixing of the different kinds of juice and bacteria can also be effected with advantage.

As the completely fermented green juice presents substantially the same properties as the tobacco lye obtained from fermented tobacco by the processes hitherto adopted (moreover the juice has the advantage of possessing the characteristic aroma of the particular kind of tobacco used in each case) it can also be used for all other purposes for which the tobacco lye obtained by the processes hitherto employed have been utilized. It also presents the further great advantage that unlike tobacco lyes of the known kind it is not liable to deterioration.

In addition to use for chewing tobacco such an important method of use resides in employment for extirpating animal and vegetable pests. In order to specially adapt the juice for this purpose, at the beginning of the treatment the chemical agents known *per se* for preventing the volatilization of the nicotin as a result of heat are added. With the same percentage of nicotin present the juice according to the invention is more active than the juices hitherto used. The juice can also be freed from nicotin and thereby utilized for the manufacture of cigars and chewing tobacco and snuff free from nicotin.

What I claim is:—

A process of treating the expressed green juice of portions of the tobacco plant, which process comprises (*a*) allowing fermentative decomposition of said juice to be produced by the naturally occurring enzyms and bacterial flora of the natural tobacco leaf, and to proceed up to the production of a brownish color therein, and until a marked reduction of the pungent odor of the raw juice occurs, (*b*) heating the juice to a temperature of about 80° C., to substantially prevent mildewing of said juice, and then cooling to ordinary temperature, (*c*) thereafter slowly heating said liquid juice to a temperature of about 60 to 70° C., and maintaining said temperature until a characteristic "fermented tobacco" odor is developed therein.

In testimony whereof I affix my signature in presence of two witnesses.

THEODOR OELENHEINZ.

Witnesses:
  JOSEPH PEIFFER,
  S. H. SHANK.